US006522451B1

(12) United States Patent
Lynam

(10) Patent No.: US 6,522,451 B1
(45) Date of Patent: Feb. 18, 2003

(54) EXTERIOR MIRROR PLANO-AUXILIARY REFLECTIVE ELEMENT ASSEMBLY

(75) Inventor: Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/478,315

(22) Filed: Jan. 6, 2000

(51) Int. Cl.⁷ .............................. G02F 1/15; G02B 5/08; G02B 5/10; G02B 7/182; B60R 1/06
(52) U.S. Cl. .................. 359/265; 359/267; 359/841; 359/850; 359/864; 359/866; 359/868; 359/872; 359/877; 248/549; 248/900
(58) Field of Search ................. 359/841, 850, 359/851, 855, 864, 865, 866, 868, 872, 877, 265, 267; 248/549, 900

(56) References Cited

U.S. PATENT DOCUMENTS

| | | | | |
|---|---|---|---|---|
| 2,911,177 A | * | 11/1959 | West | |
| 3,104,274 A | * | 9/1963 | King | 359/864 |
| 3,170,985 A | * | 2/1965 | Katulich | |
| 3,375,053 A | | 5/1968 | Ward | 350/293 |
| 3,389,952 A | * | 6/1968 | Tobin, Jr. | 359/864 |
| 3,764,201 A | * | 10/1973 | Haile | |

(List continued on next page.)

FOREIGN PATENT DOCUMENTS

| | | | | |
|---|---|---|---|---|
| DE | 2409748 | | 9/1975 | |
| DE | 3302735 | * | 8/1984 | 359/866 |
| DE | 4026578 | * | 4/1992 | 359/850 |
| EP | 0210757 | * | 2/1987 | 359/864 |
| EP | 0310261 A1 | | 4/1989 | |
| EP | 0551802 | * | 1/1992 | 359/864 |

(List continued on next page.)

OTHER PUBLICATIONS

U.S. Pat. Ser. No. 09/350,930, filed Jul. 12, 1999, entitled Electrochromic Polymer Solid Films, Manufacturing Electrochromic Devices Using Such Films, and Processes for Making Such Solid Films an Devices, by Applicants Desaraju V. Varaprasad et al.

Primary Examiner—Ricky D. Shafer
(74) Attorney, Agent, or Firm—Van Dyke, Gardner, Linn & Burkhart, LLP

(57) ABSTRACT

This invention provides a plano-multiradius reflective element assembly suitable for use in an exterior sideview mirror assembly mounted to the side body of an automobile. The plano-multiradius reflective element assembly includes a plano reflective element which has a rearward field of view, when mounted in an exterior sideview mirror assembly mounted to the side body of an automobile, with unit magnification. The plano-multiradius reflective element assembly also includes an auxiliary reflective element including a multiradius portion with a rearward field of view. The plano reflective element provides a distortion-free rearward field of view and serves as the principal rearward-viewing portion of the plano-multiradius reflective element assembly. The multiradius portion provides a wide angle rearward field of view, and typically supplements the rearward field of view of the plano portion. The plano reflective element and the multiradius portion are separated by a demarcation element which enables the driver to readily delineate a rearward view in the plano portion from a rearward view in the multiradius portion. The plano reflective element and the multiradius reflective element are individually, separately, and adjacently attached to a single backing plate which is mounted to an actuator of the exterior sideview mirror assembly. By adjusting the position of the backing plate within the housing of the exterior sideview mirror assembly via the actuator, the rearward field of view of both the plano reflective element and the multiradius reflective element are simultaneously and similarly aligned.

40 Claims, 8 Drawing Sheets

U.S. PATENT DOCUMENTS

| | | | | |
|---|---|---|---|---|
| 4,258,979 A | * | 3/1981 | Mahin | 359/868 |
| 4,268,120 A | | 5/1981 | Jitsumori | 350/302 |
| 4,281,899 A | * | 8/1981 | Oskam | |
| 4,306,770 A | * | 12/1981 | Marhauer | 359/866 |
| 4,311,362 A | * | 1/1982 | LaPorte | 359/864 |
| 4,331,382 A | * | 5/1982 | Graff | 359/868 |
| 4,449,786 A | | 5/1984 | McCord | 350/293 |
| 4,555,166 A | * | 11/1985 | Enomoto | 359/877 |
| 4,678,294 A | * | 7/1987 | Van Nostrand | 359/864 |
| 4,727,302 A | * | 2/1988 | Mizuta et al. | 359/877 |
| 4,770,522 A | * | 9/1988 | Alten | 359/877 |
| 4,859,046 A | * | 8/1989 | Traynor et al. | 359/866 |
| 4,917,485 A | * | 4/1990 | Baldwin, Sr. | |
| 5,005,962 A | * | 4/1991 | Edelman | 359/864 |
| 5,052,792 A | * | 10/1991 | McDonough | 359/866 |
| 5,107,374 A | * | 4/1992 | Lupo et al. | 359/841 |
| 5,115,352 A | * | 5/1992 | Do Espirito Santo | 359/864 |
| 5,166,833 A | * | 11/1992 | Shyu | |
| 5,225,943 A | * | 7/1993 | Lupo | 359/841 |
| 5,239,405 A | | 8/1993 | Varaprasad et al. | 359/272 |
| 5,432,643 A | * | 7/1995 | Huang | 359/864 |
| 5,550,677 A | | 8/1996 | Schofield et al. | 359/604 |
| 5,579,133 A | * | 11/1996 | Black et al. | 359/866 |
| 5,621,569 A | * | 4/1997 | Schlenke | 359/868 |
| 5,668,663 A | | 9/1997 | Varaprasad et al. | 359/608 |
| 5,724,187 A | | 3/1998 | Varaprasad et al. | 359/608 |
| 5,751,489 A | | 5/1998 | Caskey et al. | 359/603 |
| 5,793,542 A | * | 8/1998 | Kondo et al. | 359/866 |
| 5,796,532 A | * | 8/1998 | Kanazawa | 359/864 |
| 5,910,854 A | | 6/1999 | Varaprasad et al. | 359/273 |
| 6,032,323 A | * | 3/2000 | Smith et al. | 359/877 |
| 6,199,993 B1 | * | 3/2001 | Mou | 359/864 |

FOREIGN PATENT DOCUMENTS

| | | | | |
|---|---|---|---|---|
| FR | 2628042 | | 9/1929 | |
| GB | 1279158 | * | 6/1972 | 359/868 |
| GB | 2048189 | * | 12/1980 | 359/868 |
| GB | 2092534 | * | 8/1982 | 359/868 |
| JP | 0051637 | * | 4/1980 | 359/866 |
| JP | 62-105103 | * | 5/1987 | |
| JP | 1186443 | | 7/1989 | |
| JP | 1-208245 | * | 8/1989 | 359/871 |
| NL | 7908257 | * | 6/1981 | 359/864 |

* cited by examiner

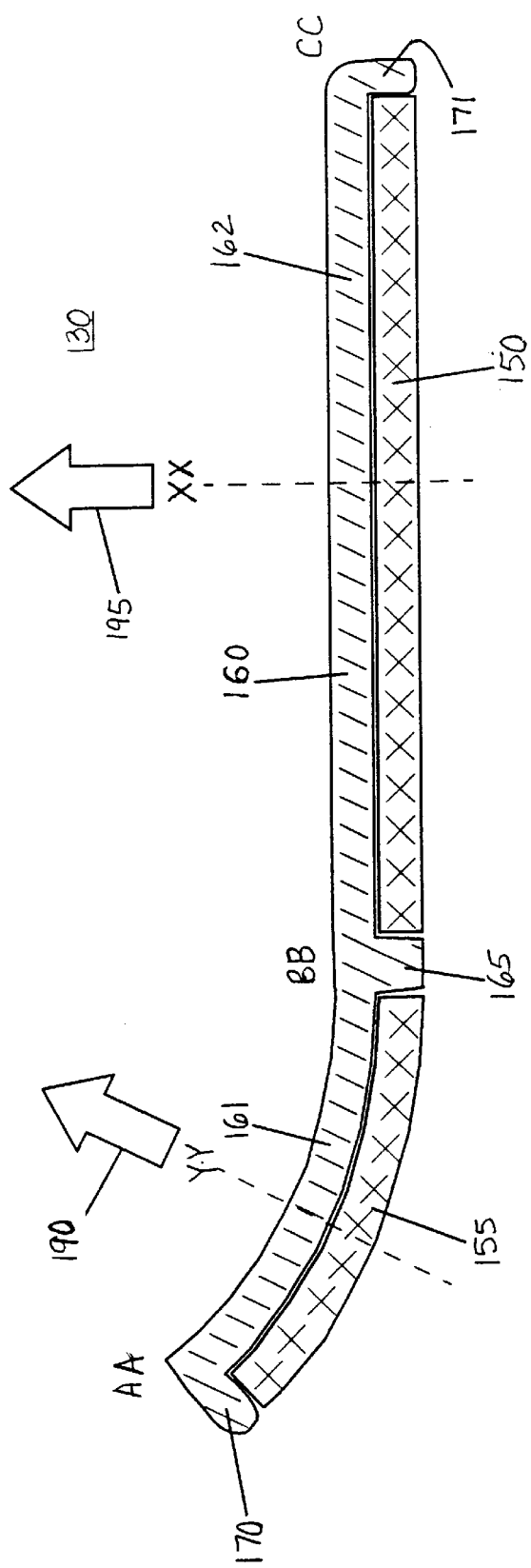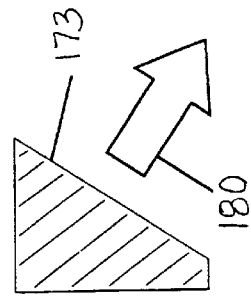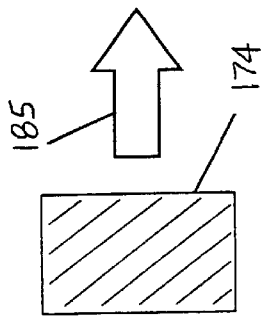
Figure 6
Figure 6A
Figure 6B

EXTERIOR MIRROR PLANO-AUXILIARY REFLECTIVE ELEMENT ASSEMBLY

TECHNICAL FIELD AND BACKGROUND OF THE INVENTION

The present invention relates to exterior sideview mirror assemblies suitable for use on an automobile, and more specifically, to plano-auxiliary reflective element assemblies for use in automobile exterior sideview mirror assemblies.

Automobiles are typically equipped with an interior rearview mirror assembly (adapted for providing a rearward field of view immediately rearward of the vehicle, typically principally in the road lane the vehicle is traveling in) and at least one exterior sideview mirror assembly attached to the side of the vehicle (typically adjacent a front side window portion). The exterior side view mirror assembly typically comprises a reflective element adapted to provide a rearward field of view of the side lane adjacent the vehicle so as to allow the driver see whether a side approaching vehicle is present when the driver is contemplating a lane change. Conventionally, automobiles are equipped with a driver-side exterior mirror assembly and, very often, with a passenger-side exterior sideview mirror assembly mounted to the side of the automobile body opposite to that of the driver-side assembly. While the combination of an interior rearview mirror with a driver-side exterior mirror (and especially in a three-mirror system comprising an interior rearview mirror with a driver-side exterior mirror and a passenger-side exterior mirror) works well in many driving situations, rear vision blind spots present a potential safety hazard while driving. A rear vision blind spot is an area adjacent the side of an automobile where a view of another vehicle (overtaking on that side) is not captured in the rearward field of view of the exterior mirror reflector on that side. This presents a potential safety hazard as the driver, upon checking the view in the exterior sideview mirror and seeing no overtaking vehicle therein, may deem it safe to initiate a lane change, unaware that there is a vehicle immediately adjacent in a blind-spot of the exterior mirror reflector.

Various attempts have been made conventionally to minimize and/or eliminate exterior mirror blind-spots on vehicles. One approach is to make the exterior mirror reflector larger, and particularly wider with respect to the vehicle body. By increasing the width of the exterior mirror reflector, it has a wider field of view rearwards, and hence the reflector blind-spot is reduced. While use of a wide exterior mirror reflector is an option for trucks, buses and commercial vehicles, increasing the width of the reflector used in an exterior sideview mirror assembly mounted on automobiles (such as sedans, station wagons, sports cars, convertibles, minivans, sports utility vehicles, pick-up trucks and similar passenger carrying automobiles) is often not an option. In such domestic automobiles, increasing the width of the exterior mirror reflector increases the size of the exterior sideview mirror assembly with a concomitant increase in aerodynamic drag, increase in fuel consumption, increased difficulty in parking in tight parking spaces, and increased reflector vibration. Use of a non-flat, curved exterior mirror reflector is commonly used to increase rearward field of view without increasing reflector size.

While working well to increase field of view, use of a curved reflector (such as a convex, spherically-curved reflector) has disadvantages. The field of view rearward increases as the degree of curvature of the bent substrate increases (i.e., the field of view rearward increases as the radius of curvature of the bent substrate decreases). However, such wide-angle mirrors have non-unit magnification and distance perception rearward is distorted. For this reason, convex (spherically-bent) exterior mirror reflectors are required in some countries (such as the United States) to carry a safety warning "OBJECTS IN MIRROR ARE CLOSER THAN THEY APPEAR". Distance perception is particularly important for a driver-side exterior mirror. Indeed, Federal Vehicle Safety Standard No: 111 in the United States (the entire disclosure of which is hereby incorporated by reference herein) requires that the driver-side exterior mirror reflector exhibit unit magnification, and places restrictions on the radius of curvature allowed for any bent passenger-side mirror as well as requiring a safety warning be placed thereon. As an improvement over spherically bent/convex mirror reflectors, aspherical or multiradius mirror reflectors (such as are disclosed in U.S. Pat. Nos. 4,449,786 and 5,724,187, the entire disclosures of which are hereby incorporated by reference herein) have been developed. Such mirrors are widely used in Europe and Asia for both driver-side exterior mirror reflectors and for passenger-side exterior mirror reflectors. The aspherical or multiradius mirror reflectors typically have a less curved (larger radius of curvature) reflective region that is inboard or closest to the driver when mounted on a vehicle and, usually separated by a demarcation line or the like, have a more curved (smaller radius of curvature) region that is outboard or farthest from the driver when mounted on a vehicle. However, such aspherical or multiradius reflectors do not have unit magnification and so cannot be used when unit magnification is mandated (such as by FMVSS 111, referenced above).

To supplement a flat driver-side exterior mirror reflector, an auxiliary and separate bent reflector is sometimes incorporated into the driver-side exterior sideview mirror assembly. However, this is often not suitable for passenger automobiles because of the extra space required in the sideview mirror assembly to accommodate an auxiliary reflector element. Also, in most passenger automobiles, the position of the side view mirror reflector is adjustable by the driver (such as by a hand-adjust, or by a manually adjustable cable such as a Bowden cable or by an electrically operable actuator, as known in the art) in order to provide to that driver his or her desired rearward field of view, which ill-suits use of a separate, auxiliary reflector. Likewise, addition of stick-on blind-spot mirror reflectors (such as are commonly sold in automotive parts stores and the like) onto an automobile exterior sideview mirror reflector has disadvantages, including obscuring field of view of the automobile mirror reflector and adding to mirror element vibration.

There is thus a need to provide an automobile exterior sideview reflective element, and particularly a driver-side automobile exterior sideview reflective element, that overcomes the disadvantages above and that provides the driver of the automobile with a distortion-free field of view with unit magnification that is supplemented with a wide-angle view of a side lane blind spot, and there is a need that this be provided in a unitary reflective element assembly module suitable to mount onto, and be adjusted by, the mirror reflector adjustment mechanism (such as an electrically operated, motorized actuator) provided in the exterior sideview mirror assembly.

BRIEF DESCRIPTION OF THE DRAWINGS

FIG. 6 is a sectional view of a second embodiment of a plano reflective element assembly according to the present invention including a demarcation element formed as a dividing wall in a backing plate element;

FIG. 6A is a cross-section taken along line XX of FIG. 6;

FIG. 6B is a cross-sectional view taken along line YY of FIG. 6; and

SUMMARY OF THE INVENTION

Figure 1:
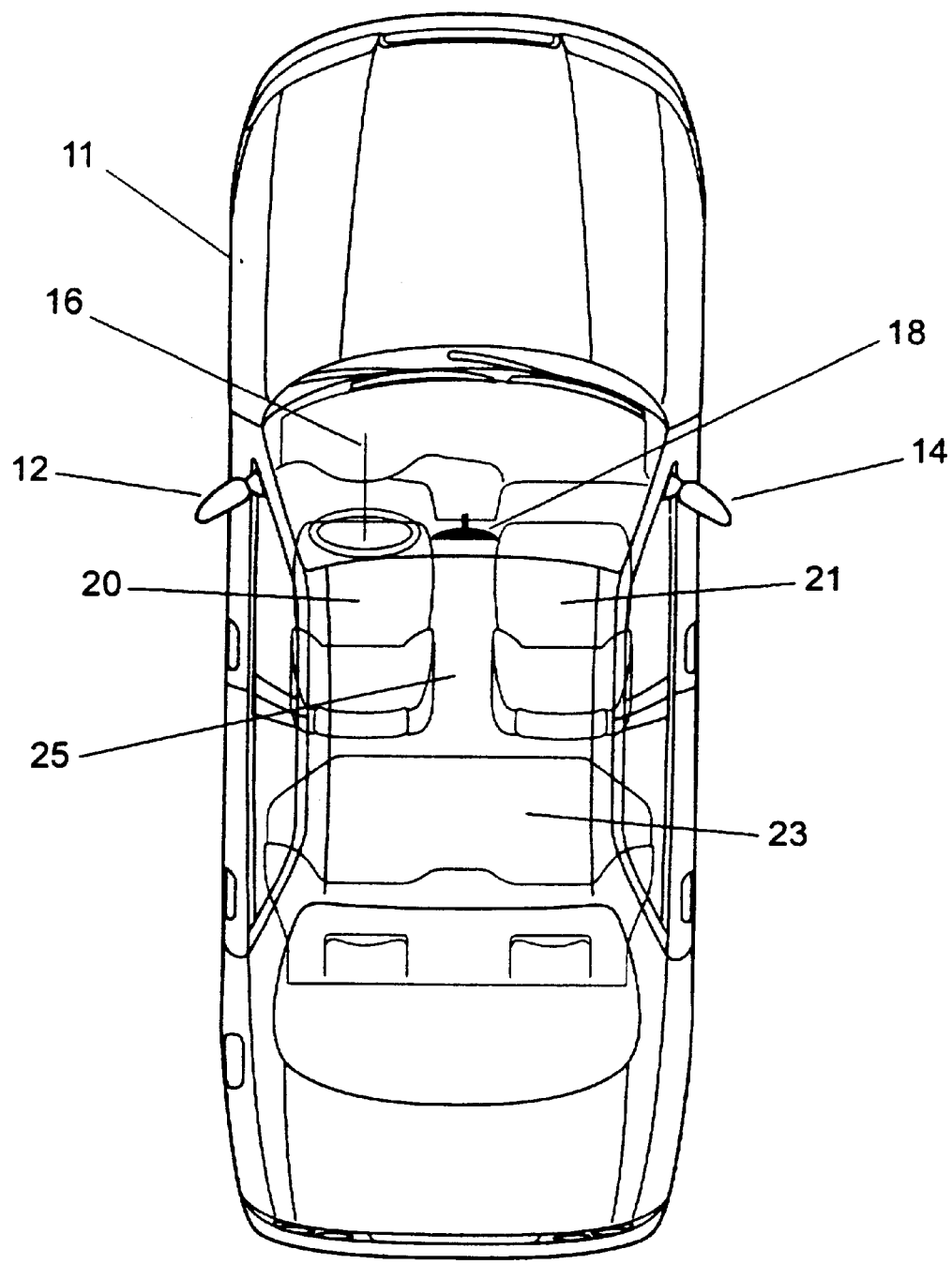
FIG. 1 is a perspective view of an automobile equipped with exterior sideview mirror assemblies according to this present invention.

This invention provides a plano reflective element with unit magnification and an auxiliary reflector element for use in an exterior sideview mirror assembly on an automobile. More specifically, this invention provides a plano-multiradius reflective element assembly suitable for use in an exterior sideview mirror assembly mounted to the side body of an automobile. The plano-multiradius reflective element assembly of this invention is especially suitable for mounting in a driver-side exterior sideview mirror assembly that is mounted to the side of the automobile body adjacent to the seating position of the driver in the front of the interior vehicular cabin. The plano-multiradius reflective element assembly of this invention comprises a plano portion which has a rearward field of view, when mounted in an exterior sideview mirror assembly mounted to the side body of an automobile, with unit magnification. This plano portion comprises a flat substrate, typically a flat glass substrate, provided with a reflective surface. The plano-multiradius reflective element assembly of this invention also includes a multiradius portion with a rearward field of view, when mounted in an exterior sideview mirror assembly mounted to the side body of an automobile, that has non-unit magnification. The plano portion provides a distortion-free rearward field of view and serves as the principal rearward-viewing portion of the plano-multiradius reflective element. The multiradius portion provides a wide angle rearward field of view, and typically supplements the rearward field of view of the plano portion. This multiradius portion comprises a curved substrate, typically a bent glass substrate, provided with a reflective surface. The plano portion and the multiradius portion are demarcated apart by a demarcation element. The demarcation element enables the driver of a vehicle equipped with the plano-multiradius reflective element of this invention to readily delineate a rearward view in the plano portion from a rearward view in the multiradius portion. The plano portion comprises a flat reflective element and the multiradius portion comprises a bent reflective element. The flat, plano reflective element and the curved, multiradius reflective element are individually and separately manufactured, and are adjacently attached to a single backing plate (which typically comprises a polymeric substrate, most typically a molded polymeric substrate), and with the demarcation element disposed at the joint of the plano, flat reflective element and the multiradius, bent reflective element. The backing plate is fabricated (typically by polymeric molding) to have a flat portion that corresponds to the plano, flat reflective element, and a curved surface that corresponds to the multiradius, curved reflective element. The attachment of the plano reflective element and an auxiliary reflective element to a single backing plate produces a unitary plano-auxiliary reflective element assembly module suitable for mounting in an exterior sideview mirror assembly. By adjusting the position of the backing plate within the exterior sideview mirror assembly, the rearward fields of view of both the plano reflective element and the auxiliary reflective element are simultaneously and similarly aligned.

One embodiment of the invention includes an exterior sideview mirror system suitable for use in an automobile comprising an exterior sideview mirror assembly adapted for attachment to a side of the automobile. The exterior sideview mirror assembly includes a reflective element having a rearward field of view when attached to said side of the automobile. The reflective element is attached to an actuator and is movable by the actuator in order to position the reflective element's rearward field of view in response to a control. The reflective element comprises a plano-multiradius reflective element assembly which comprises a plano reflective element having unit magnification and a separate multiradius reflective element having a multiradius curvature. The plano element and the separate multiradius element of the plano-multiradius reflective element assembly are attached to a backing plate element. The backing plate element is mounted to the actuator such that movement of the backing plate element (and hence the plano-multiradius reflective element assembly) by the actuator simultaneously and similarly moves the plano element and the multiradius element. The plano element and the multiradius element are separately and, preferably, adjacently attached to the backing plate element at a joint.

In a further embodiment, a demarcation element is disposed at this joint to form a demarcation between the plano element and the multiradius element; this demarcation element having a portion visible to a driver of the automobile. Preferably, the demarcation element is dark colored, such as with a color selected from the group consisting of black, grey, blue and brown. Optionally, there is a space at the joint of the plano element and the multiradius element and the demarcation element is at least partially disposed in said space between said plano element and said multiradius element. The demarcation element can comprise at least one of a polymer material, a tape, a plastic film, a paint, a lacquer and a caulk.

In a further embodiment, the demarcation element comprises a wall on the backing plate element; this wall being located on the backing plate element at the joint of the plano element and the multiradius element, this wall separating the respective elements apart.

In preferred embodiments, the portion of the demarcation element visible to a driver of an automobile equipped with the plano-multiradius reflective element assembly of this invention has a width from about 0.5 mm to about 4 mm.

In preferred embodiments, the plano element is attached to the backing plate element by at least one of an adhesive attachment and a mechanical attachment.

In preferred embodiments, the multiradius element is attached to the backing plate element at a location such that, when the exterior mirror assembly is attached to a side of an automobile, at least portion, and preferably at least a substantial portion, of the plano element is disposed closer to the side of the vehicle than any portion of the multiradius element element.

In preferred embodiments, the multiradius element comprises a bent glass substrate with radii of curvature in the range of from about 4000 mm to about 50 mm, and the ratio of the width of the plano element to the width of the multiradius element is greater than 1.

In preferred embodiments, the principal axis of the rearward field of view of the auxiliary, multiradius element is different from and angled to the principal axis of the rearward field of view of the plano element when both are attached to the backing plate element of the plano-multiradius reflective element assembly and when the plano-multiradius reflective element assembly is mounted in an exterior sideview mirror assembly on an automobile. The principal axis of the rearward field of view of the plano element is directed generally parallel to the longitudinal axis of an automobile equipped with the plano-multiradius reflective element assembly and the principal axis of the rearward field of view of the multiradius element is directed generally at an angle downwards to the longitudinal axis of the vehicle.

In a preferred embodiment, the exterior sideview mirror assembly equipped with the plano-multiradius reflective element assembly comprises a fixedly attached exterior sideview mirror assembly. In another preferred embodiment, the exterior sideview mirror assembly equipped with the plano-multiradius reflective element assembly comprises a break-away exterior sideview mirror assembly. In another preferred embodiment, the exterior sideview mirror assembly equipped with the plano-multiradius reflective element assembly comprises a powerfold exterior sideview mirror assembly. In another preferred embodiment, the actuator of the exterior sideview mirror assembly to which the plano-multiradius reflective element assembly is mounted comprises an electrically operable actuator. In another preferred embodiment, the actuator of the exterior sideview mirror assembly to which the plano-multiradius reflective element assembly is mounted is controlled by a switch or by a memory controller. In another preferred embodiment, the plano element and/or the multiradius element of the plano-multiradius reflective element assembly comprises an electro-optic reflective element, preferably an electrochromic reflective element. In another preferred embodiment, the plano element of the plano-multiradius reflective element assembly comprises an electro-optic reflective element, preferably an electrochromic reflective element, and the multiradius element comprises a fixed reflectance mirror reflector, such as a fixed reflectance mirror reflector comprises a bent glass substrate coated with a metallic reflector coating.

In a preferred embodiment, the plano-auxiliary reflective element assembly is assembly is formed in an integral molding operation.

These and other advantages, features, and modifications will become more apparent when reviewed in conjunction with the drawings and the detailed description which follows.

DETAILED DESCRIPTION OF THE PREFERRED EMBODIMENTS

Figure 2:
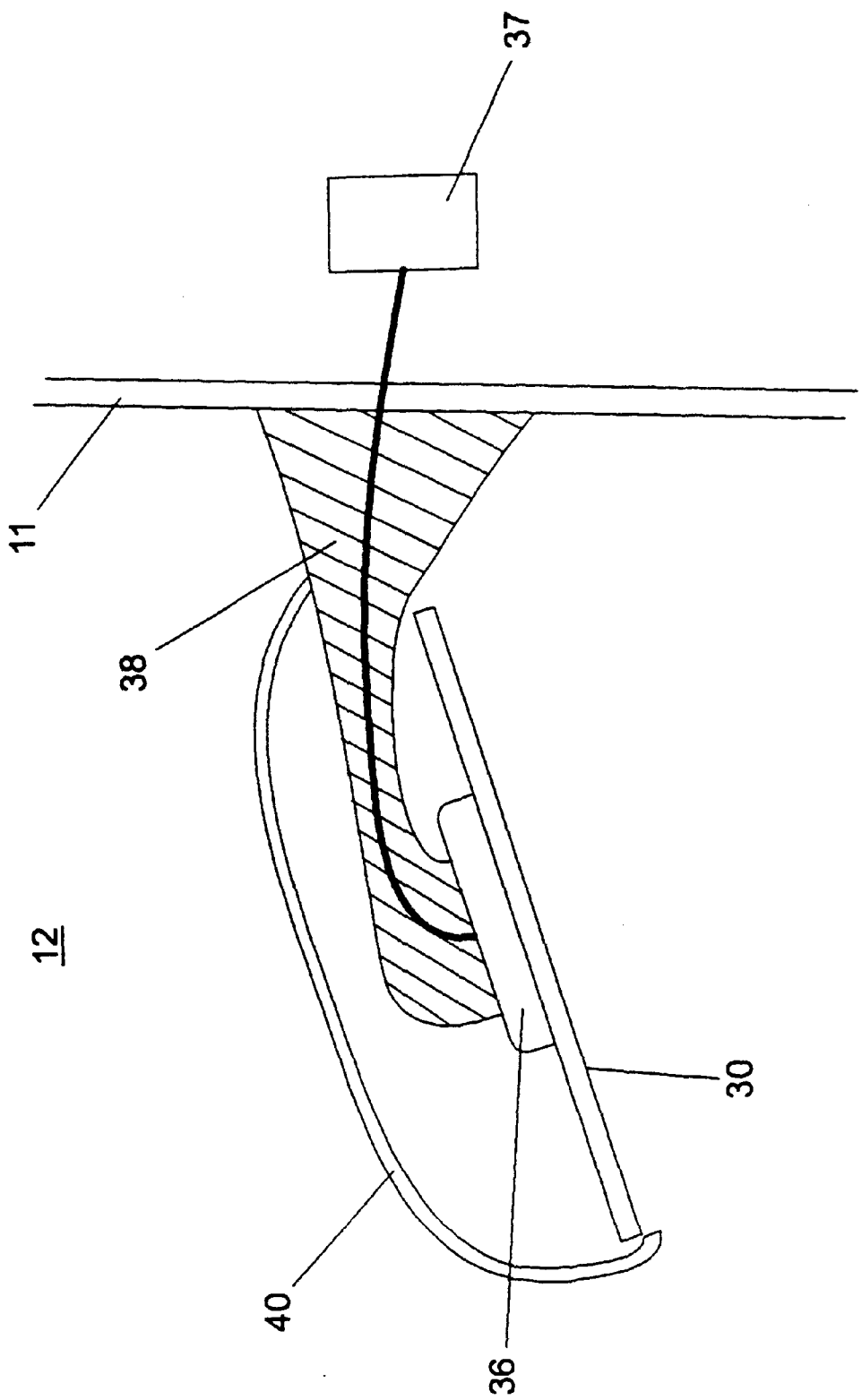
FIG. 2 is a top plan partial fragmentary view of the driver's side exterior rearview mirror assembly of FIG. 1.

As illustrated in FIG. 1, passenger automobile 10 (which may be a sedan, a station-wagon, a sports car, a convertible, a minivan, a sports utility vehicle, a pick-up truck or a similar passenger carrying non-commercial, personal transportation automobile) includes an interior rearview mirror assembly 18 positioned within interior vehicle cabin 25. Interior vehicle cabin 25 further includes a steering wheel 16, a driver seat 20 positioned at steering wheel 16, a front passenger seat 21 adjacent to driver seat 20 in the front portion of cabin 25, and a rear passenger seat 23 in the rear portion of cabin 25. Automobile 10 further includes a driver-side exterior sideview mirror assembly 12 and a passenger-side exterior sideview mirror assembly 14, each adapted for attachment to opposing sides of automobile body 11, most preferably adjacent to the seating position of the driver seated in driver seat 20 for driver-side assembly 12 and adjacent to the front passenger seat 21 for passenger-side assembly 14. Exterior sideview mirrors, mounted as shown in FIG. 1 close to the driver seating location, are commonly referred to as door-mounted exterior sideview mirror assemblies. Driver-side exterior sideview mirror assembly 12 includes, as illustrated in FIG. 2, a plano-multiradius exterior sideview reflective element assembly 30. Plano-multiradius reflective element assembly 30 is mounted to a reflective element positioning actuator 36. The orientation of plano-multiradius reflective element assembly 30, and hence its rearward field of view, is adjustable by actuator 36 in response to control 37. Control 37 can comprise a handset control that allows the driver manually move the orientation of plano-multiradius reflective element assembly 30 within exterior mirror housing 40 (such as by a lever control or by a cable control) and hence reposition the rearward field of view of plano-multiradius reflective element assembly 30. Alternately, when actuator 36 comprises an electrically actuated actuator that is electrically operable incorporating at least one motor, control 37 can comprise a switch (which, preferably, is operable under control of the driver seated in cabin 25) or control 37 can comprise a memory controller, as known in the automotive mirror art, that controls actuator 36 to move the position of plano-multiradius reflective element assembly 30 to a preset orientation that suits the rearward field of view preference of an individual driver. Actuator 36 is mounted to bracket 38 which attaches to vehicle body side 11. Plano-multiradius reflective element assembly 30 is positionable by actuator 36 within exterior mirror housing 40.

Figure 3:
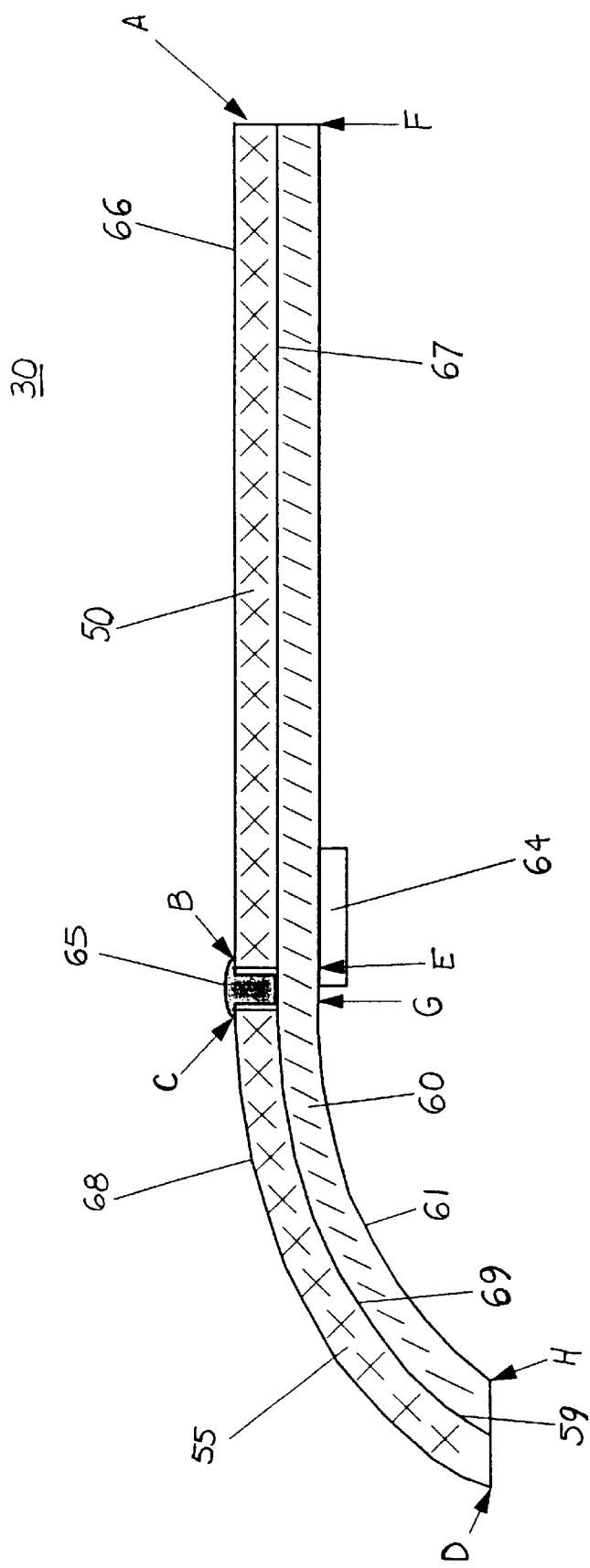
FIG. 3 is an enlarged sectional view of a plano-multiradius reflective element assembly of the mirror assembly in FIG. 2.

Plano-multiradius reflective element assembly 30, as shown in FIG. 3, comprises a plano element 50 and a separate multiradius element 55. Preferably, plano element 50 is adjacent to multiradius element at a joint. At their joint, plano element 50 and separate multiradius element 55 can touch leaving substantially no gap or space therebetween, or plano element 50 and separate multiradius element 55 can be spaced apart at their joint by a space or gap, as in FIG. 3. Plano element 50 and multiradius element 55 are both mounted to surface 59 of, and are both supported by, a single backing plate element 60. Plano element 50 and multiradius element 55 are demarcated apart by demarcation element 65. Surface 61 of backing plate element 60 is preferably adapted to attach, such as by attachment member 64, to actuator 36 when plano-multiradius reflective element assembly 30 is mounted in driver-side exterior sideview mirror assembly 12 (and/or in passenger-side exterior side view mirror assembly 14) such that plano element 50 and multiradius element 55 are adjusted and positioned in tandem and simultaneously when the driver (or alternatively, when a mirror memory system, as is conventional in the rearview mirror arts) activates actuator 36 to reposition the rearward field of view of plano-multiradius reflective element assembly 30. Thus, since elements 50, 55 are part of plano-multiradius reflective element assembly 30, movement of plano-multiradius reflective element assembly 30 by actuator 36 simultaneously and similarly moves plano element 50 and multiradius element 55.

Plano element 50 preferably comprises a flat reflector-coated glass substrate having unit magnification, and comprises a reflective surface through which the angular height and width of the image of an object is equal to the angular height and width of the object when viewed at the same distance (except for flaws that do not exceed normal manufacturing tolerances). Plano element 50 may comprise a conventional fixed reflectance mirror reflector or it may comprise a variable reflectance mirror reflector whose reflectivity is electrically adjustable. For example, plano element 50 may comprise a flat glass substrate coated with a metallic reflector coating such as a chromium coating, a titanium coating, a rhodium coating, a metal alloy coating, a nickel-alloy coating, a silver coating, an aluminum coating (or any alloy or combination of these metal reflectors). The metal reflector coating of plano element 50 may be a first surface coating (such as on surface 66) or a second surface coating (such as on surface 67), as such terms are known in the mirror art. The reflector coating on plano element 50 may also comprise a dielectric coating, or a multilayer of dielectric coatings, or a combination of a metal layer and a dielectric layer to form automotive mirror reflectors as known in the automotive mirror art. If a variable reflectance reflector element, plano element 50 preferably comprises an electro-optic reflector element and, most preferably, an electrochromic reflector element.

When mounted into exterior side view mirror assembly 12 and/or 14, plano-multiradius reflective element assembly 30 is preferably orientated so that at least a portion of (more preferably a substantial portion of) the reflector surface of plano element 50 is positioned closer to the vehicle body (and hence to the driver) than any portion of the reflector surface of multiradius element 55. Thus, and referring to FIG. 3, side A of plano element 50 of plano-multiradius reflective element assembly 30 is positioned closer to the driver than side D of multiradius element 55 when plano-multiradius reflective element assembly 30 is mounted on an automobile. Also, when mounted into exterior side view mirror assembly 12 and/or 14, surfaces 66, 68 of plano-multiradius reflective element assembly 30 face rearwardly in terms of the direction of vehicle travel.

Multiradius element 55 of plano-multiradius reflective element assembly 30 preferably comprises a curved/bent mirrored glass substrate. The degree of curvature preferably increases (and hence the local radius of curvature decreases) across the surface of multiradius element 55 with the least curvature (largest radius of curvature) occurring at the side of multiradius element 55 (side C in FIG. 3) positioned adjacent its joint to plano element 50 when both are mounted on backing plate element 60. Thus, and referring to FIG. 3, the local radius of curvature at side C of multiradius element 55, when mounted on backing plate element 60, is larger than at side D. Also, the local radius of curvature preferably progressively decreases across multiradius element 55 from side C to side D. Preferably, the local radius of curvature at side C of multiradius element 55 is at least about 1000 mm; more preferably is at least about 2000 mm and most preferably is at least about 3000 mm whereas the local radius of curvature at side D of multiradius element 55 is, preferably, less than about 750 mm, more preferably less than about 350 mm; most preferably less than about 150 mm. Preferably, multiradius element 55 comprises a bent glass substrate with radii of curvature in the range of from about 4000 mm to about 50 mm. The multiradius prescription for the multiradius element to be used in a particular exterior mirror assembly can vary according to the specific field of view needs on a specific automobile model.

The total field of view rearwardly of the automobile of the plano-auxiliary reflective element assembly (which is a combination of the field of view of the plano reflective element and of the auxiliary reflective element) preferably generally subtends an angle of at least about 20 degrees (and more preferably, generally subtends an angle of at least about 25 degrees and most preferably, generally subtends an angle of at least about 30 degrees) with respect to the side of an automobile to which is attached an exterior sideview mirror assembly equipped with the plano-auxiliary reflective element assembly.

Multiradius element 55 may comprise a conventional fixed reflectance mirror reflector or it may comprise a variable reflectance mirror reflector whose reflectivity is electrically adjustable. For example, multiradius element 55 may comprise a flat glass substrate coated with a metallic reflector coating such as a chromium coating, a titanium coating, a rhodium coating, a metal alloy coating, a nickel-alloy coating, a silver coating, an aluminum coating (or any alloy or combination of these metal reflectors). The metal reflector coating of multiradius element 55 may be a first surface coating (such as on surface 68) or a second surface coating (such as on surface 69), as such terms are known in the mirror art. The reflector coating on multiradius element 55 may also comprise a dielectric coating, or a multilayer of dielectric coatings, or a combination of a metal layer and a dielectric layer to form automotive mirror reflectors as known in the automotive mirror art. If a variable reflectance reflector element, multiradius element 55 preferably comprises an electro-optic reflector element and, most preferably, an electrochromic reflector element.

Also, it is preferable that the thickness of plano element 50 and multiradius element 55 be substantially the same in dimension so that their respective outer surfaces, 66 and 68, are substantially coplanar so that a driver can readily view images in either or both elements. The thickness dimension of elements 50,55 is determined by the thickness of the substrate (or in the case of laminate-type electrochromic reflective elements, the thickness of the two substrates between which the electrochromic medium is disposed). For example, plano element 50 and/or multiradius element 55 can comprise a reflector coated glass substrate or panel of thickness preferably equal to or less than about 2.3 mm, more preferably equal to or less than about 1.6 mm, most preferably equal to or less than about 1.1 mm. Use of a thinner substrate is beneficial in terms of improving the overall stability/vibration performance of the image seen in plano-multiradius reflective element assembly 30 when mounted to an automobile.

The reflector area of plano element 50 is preferably larger than that of multiradius element 55. Preferably, the width dimension of plano element 50 is larger than the width dimension of multiradius element 55 (both width dimensions measured at their respective widest dimension and with the width of the respective element being gauged with the respective element oriented as it would be orientated when mounted on the automobile). Thus, and referring to FIG. 3, the distance from side A to side B of plano element 50 is larger than the distance from side C to side D of multiradius element 55. Thus, the ratio of the width of plano element 50 to the width of multiradius element 55 is preferably greater than 1; more preferably greater than 1.5; most preferably greater than 2.5 in order to provide a large, unit magnification plano element 50 as the principal rear viewing portion of plano-multiradius reflective element assembly 30 and providing multiradius element 55 as a smaller, auxiliary, separate, wide-angle viewing portion of plano-multiradius reflective element assembly 30. For plano-multiradius reflective element assemblies to be mounted to the exterior sideview assemblies of passenger automobiles used non-commercially and for non-towing purpose, the width of plano element 50 (at its widest dimension) is preferably in the range of from about 50 mm to about 225 mm; more preferably in the range of from about 75 mm to about 175 mm; most preferably in the range of from about 100 mm to about 150 mm.

Backing plate element 60 is preferably a rigid polymeric substrate capable of supporting plano element 50 and multiradius element 55. Backing plate element 60 comprises a flat portion (generally between E and F as shown in FIG. 3) that corresponds to and is aligned with plano element 50. Backing plate element 60 also comprises a curved portion (generally between G and H as shown in FIG. 3) that corresponds to and is aligned with multiradius element 55. Preferably, curved portion G–H of multiradius element 55 is fabricated with a multiradius prescription that is substantially the same as the multiradius prescription of multiradius element 55. Backing plate element 60 is formed as a single element to which elements 50 and 55 are separately attached. Preferably, backing plate element 60 is formed by injection molding of a thermoplastic or a thermosetting polymer resin. Materials suitable to use for backing plate element 60 include unfilled or filled polymeric materials such as glass and/or mineral filled nylon or glass and/or mineral filled polypropylene, ABS, polyurethane and similar polymeric materials. For example, backing plate element 60 can be formed of ABS in an injection molding operation. Plano element 50 can be cut from a stock lite of flat chromium mirror-coated 1.6 mm thick glass. Multiradius element 55 can be cut from a stock lite of multiradiusly-bent chromium mirror-coated 1.6 mm thick glass. Plano element 50 and multiradius element 55 can then be attached (such as by an adhesive attachment such as an adhesive pad or by mechanical attachment such by clips, fasteners or the like) to the already molded backing plate element 60. Alternatively, plano element 50 and multiradius element 55 can each by individually loaded into an injection molding tool. Once loaded, a polymeric resin (or the monomers to form a polymeric resin) can be injected into the mold in order to integrally form backing plate element 60 with elements 50, 55 integrally molded thereto. Integral molding of the backing plate element to plano element 50 and multiradius element 55 (along with any other elements such as the demarcation element 65) in a single integral molding operation, is a preferred fabrication process for plano-multiradius reflective element assembly 30.

Figure 4:
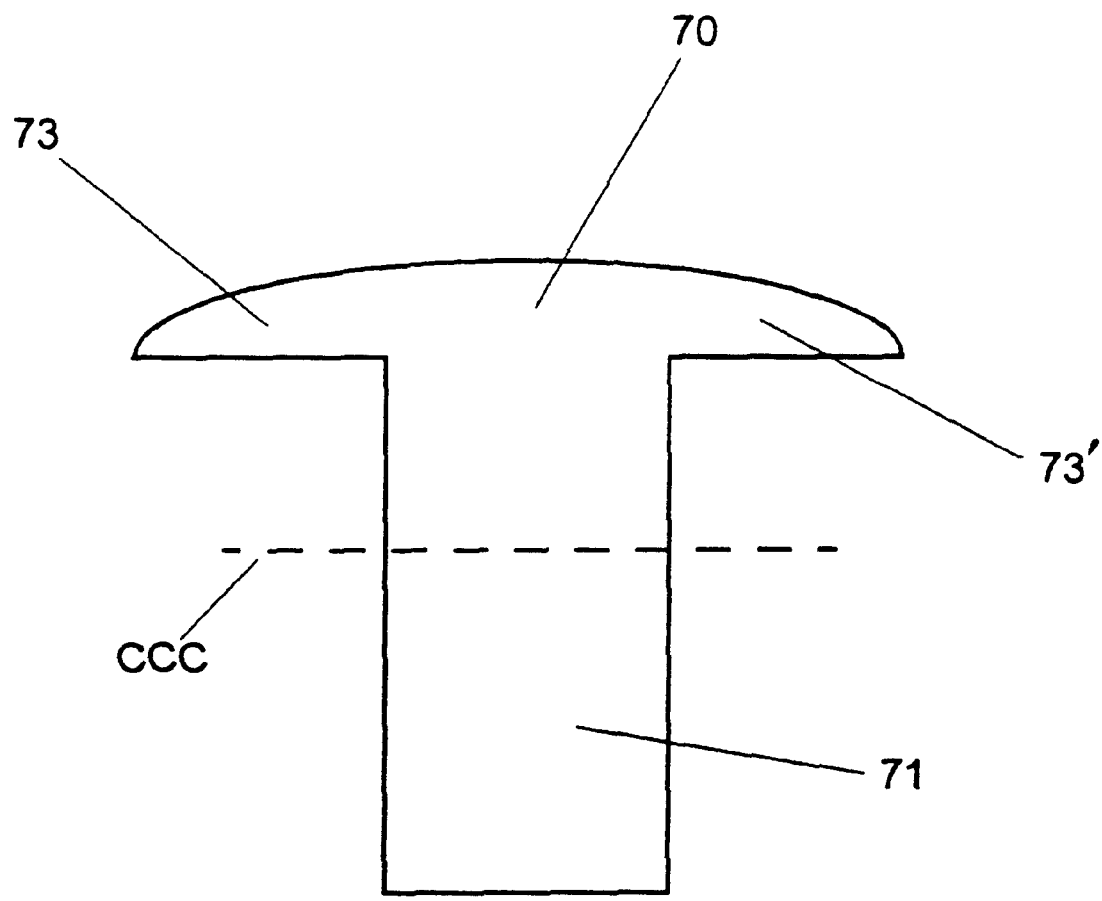
FIG. 4 is an enlarged sectional view of a demarcation element of the plano-multiradius reflective element assembly of FIG. 3.

Plano-multiradius reflective element assembly 30 further preferably includes demarcation element 65 that functions to delineate and demarcate the plano region of the assembly from the wide-angle, multiradius region and also preferably functions to prevent ingress of debris, dirt, water and similar contaminants (such as road splash, car wash spray, rain, snow, ice, leaves, bugs and similar items that plano-multiradius reflective element assembly 30 would be subject to when mounted and used on an automobile) into any gap between plano element 50 and multiradius element 55 when both are attached to backing plate element 60. Optionally, at least a portion of demarcation element 65 can be disposed in any gap between plano element 50 and multiradius element 55 at their joint on backing plate element 60. Preferably, demarcation element 65 is formed of a polymeric material that is dark colored (such as black or dark blue or dark brown or dark grey or a similar dark color) such as a dark colored polypropylene resin or a dark colored nylon resin or a dark colored polyurethane resin or a dark colored polyvinyl chloride resin or a dark colored silicone material. Most preferably demarcation element 65 is formed of an at least partially elastomeric material (such as silicone, or EPDM, or plasticized PVC or the like) in order to provide a degree of vibration dampening for elements 50, 55. As shown in FIG. 4, demarcation element 65 optionally includes a crown portion 70 that includes wing portions 73, 73' and a stem portion 71. Stem portion 71 preferably has a cross-sectional width CCC of less than about 4 mm, more preferably less than about 3 mm and, most preferably less than about 2 mm. Crown portion 70 preferably is dimensioned to not protrude substantially beyond surfaces 66, 68 of elements 50, 55 when demarcation element 65 is installed between elements 50 and 55. Also, wings 73, 73' are preferably dimensioned to protrude (most preferably slightly) onto surfaces 66, 68 of elements 50, 55 when demarcation element 65 is installed between elements 50 and 55 in order to provide a weather barrier seal and/or to at least partially accommodate any dimensional tolerances of elements 50, 55 that could lead to variation in the inter-element gap between sides C and B. While the demarcation element shown in FIG. 4 is one embodiment, other constructions are possible including a demarcation element that has minimal or no crown portion. Likewise, a demarcation element can have little or no stem portion, especially when the joint between plano element 50 and multiradius element 55 includes no gap to receive a stem. Also, where a gap at the plano to multiradius joint exists, any stem of the demarcation element can at least partially be disposed in such gap so as to at least partially fill the gap (or it can optionally substantially fill the gap). Optionally, demarcation element 65 is fabricated by injection molding of a polymeric resin. After plano element 50 and multiradius element 55 have been attached to backing plate element 60, a separately formed demarcation element 65 can then be inserted (and secured such as by an adhesive or by a mechanical attachment such as by a fastener) into a space between elements 50 and 55. Note that, optionally, side B of plano element 50 and side C of multiradius element 55 can touch (leaving substantially no gap or space therebetween). In such a situation, demarcation element 65 can comprise a dark colored strip such as of a tape or of a plastic film that covers the joint between elements 50 and 55. Alternatively, demarcation element 65 can comprise a preferably dark-colored paint, lacquer, caulk or similar material that can be applied to, and that can preferably fill into, the joint between elements 50 and 55. The width of the portion of demarcation element 65 that is visible to the driver is preferably less than about 4 mm, more preferably less than about 3 mm and most preferably less than about 2 mm, but is equal to or greater than about 0.5 mm, more preferably is equal to or greater than about 0.75 mm, most preferably is equal to or greater than about 1 mm in order to provide adequate demarcation of the plano region from the multiradius radius region without unduly obscuring the rearward field of view of the respective elements. Optionally, demarcation element 65 can be formed as part of backing plate element 60 such as by forming demarcation element 65 as a wall structure of the backing plate element that partitions backing plate element 60 into two regions: A first region adapted to receive plano reflective element 50 and a separate and adjacent second region adapted to receive multiradius reflective element 55.

Thus, and referring to FIG. 6, a second embodiment of plano-multiradius reflective element assembly 130 may include a backing plate element 160 which comprises a plate molded from a polymer resin (such as a polyolefin such as polypropylene or such as ABS or nylon) with a demarcation element 165 that is molded as a wall structure that partitions backing plate element 165 into a first region (from CC to BB) adapted to receive and accommodate plano reflective element 150 and into a second region (from BB to AA) adapted to receive and accommodate wide-angle optic multiradius reflective element 155. Note that section AA to BB of backing plate element 160 is angled to section BB to CC. Such angling of the auxiliary reflective element relative to the plano element can be advantageous in allowing the auxiliary reflective element view a portion of the road adjacent the automobile that is in a blind spot of the plano reflective element. In this regard, it is preferable that the multiradius element be angled away from the plane of the plano element, as shown in FIG. 6 by the angling of section AA to BB to section BB to CC.

Preferably, demarcation element 65 is formed in an integral molding operation, along with formation of backing plate element 60, and attachment of elements 50, 55 thereto. For example, plano element 50 and multiradius element 55 can each by individually loaded into an injection molding tool. Once loaded, a polymeric resin (or the monomers to form a polymeric resin) can be injected into the mold in order to integrally form backing plate element 60 with elements 50, 55 integrally molded thereto and, in the same molding operation and in the same tool, also form by molding the demarcation element. Integral molding of the backing plate element to plano element 50 and multiradius element 55 along with creation in the single molding operation of demarcation element 65 (along with any other elements such as attachment member 64) in a single integral molding operation, is a preferred fabrication process for plano-multiradius reflective element assembly 30. By loading all the sub components of plano-multiradius reflective element assembly 30 into a molding tool, and then injecting polymeric resin to form the backing plate, demarcation member and any attachment member, a substantially complete or fully complete plano-multiradius reflective element assembly can be unloaded from the tool at the completion of the integral molding operation (as known in the molding art), thus enabling economy in manufacturing and accommodation of any dimensional tolerances in the sub components. Where integral molding is so used, it is preferable to use a reactive molding operation such as reactive injection molding of a urethane as such reactive injection molding operations occur at relatively modest temperatures.

Plano element 50 and/or multiradius element 55 can comprise a heater element, as known in the automotive mirror art, that is operable to deice/demist surfaces 66, 68. Such heater elements are conventional and can comprise a positive temperature coefficient heater pad, a resistive heater element and/or a conductive coating. Plano element 50 and/or multiradius element 55 can also optionally comprise a scatterproofing member, as known in the automotive mirror art, such as an adhesive tape, to enhance safety in an accident.

Also, plano element 50 and/or multiradius element 55 can comprise a variable reflectance electro-optic element such as an electrochromic mirror reflector. Thus, both element 50 and element 55 can comprise an electrochromic mirror element or either of element 50 and element 55 can comprise an electrochromic mirror element and the other can comprise a fixed reflectance non-variable reflectance mirror element such as a metal reflector coated glass panel such as a chromium coated glass substrate. Also, if both plano element 50 and multiradius element 55 comprise an electro-optic element such as an electrochromic mirror element capable of electrically dimmable reflectivity, both elements 50, 55 can dim together and in tandem under control of a common dimming control signal (typically provided by an electro-optic automatic dimming interior mirror assembly mounted in the cabin of the automobile and equipped with photosensors to detect incident glare and ambient light). Alternately, if both plano element 50 and multiradius element 55 comprise an electro-optic element such as an electrochromic mirror element capable of electrically dimmable reflectivity, element 50 can dim independently of element 55 (such as is disclosed in U.S. Pat. No. 5,550,677, the entire disclosure of which is hereby incorporated by reference herein). If either or both of elements 50, 55 comprise an electrochromic element, preferably, the electrochromic reflective element comprises a front substrate and a rear substrate with an electrochromic medium disposed between, such as a solid polymer matrix electrochromic medium such as is disclosed in U.S. patent application Ser. No. 09/350,930, filed Jul. 12, 1999, en titled "ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES" to Desaraju V. Varaprasad et al., now U.S. Pat. No. 6,154,306, or such as is disclosed in U.S. Pat. Nos. 5,668,663; 5,724,187; 5,910,854; and 5,239,405, the entire disclosures of which are hereby incorporated by reference herein. Most preferably, in such laminate-type electrochromic mirror reflective elements, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, most preferably equal to or greater than about 2.0 mm thickness. The rearmost surface of the rear substrate (the fourth surface as known in the mirror art) is reflector coated with a high reflecting metal film such as of aluminum or silver, or an alloy of aluminum or silver. Most preferably, the front-most surface of the rear substrate (the third surface as known in the mirror art) is reflector coated with a high reflecting metal film such as of aluminum or silver, or an alloy of aluminum or silver.

Backing plate element 65 of plano-multiradius reflective element assembly 30 is optionally equipped on its rearmost surface with attachment member 64 to facilitate attachment to the reflector-positioning actuator of the exterior sideview mirror assembly that plano-multiradius reflective element assembly 30 is mounted to. Attachment of plano-multiradius reflective element assembly 30 to the actuator can be by mechanical attachment such as by a tab, clip or fastener, or may be by adhesive attachment such as by a silicone adhesive, a urethane adhesive or a similar adhesive material such as a tape coated on both surfaces with a pressure sensitive adhesive to form a "double-sticky" tape. Exterior sideview mirror assembly 12 and/or 14, on whose mirror reflector-positioning actuator the plano-multiradius reflective element assembly is mounted, can be a fixedly attached exterior sideview mirror assembly, a break-away exterior sideview mirror assembly and a powerfold exterior sideview mirror assembly, as known in the automotive mirror art.

Figures 5A, 5B, 5C, 5D:
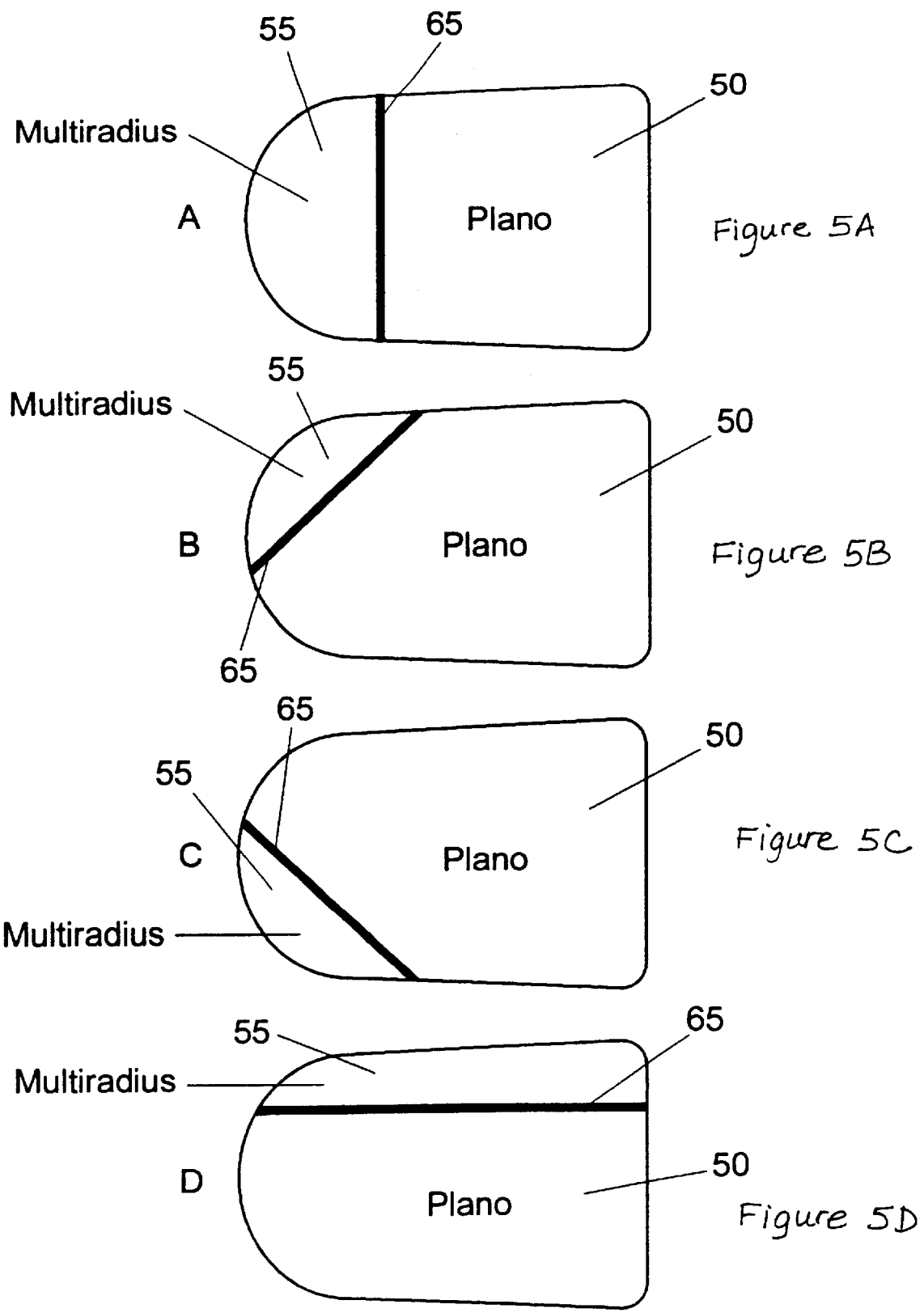
FIGS. 5A–5H illustrate views of various locations for a plano reflective element and an auxiliary reflective element according to this present invention.
Figure 5E:
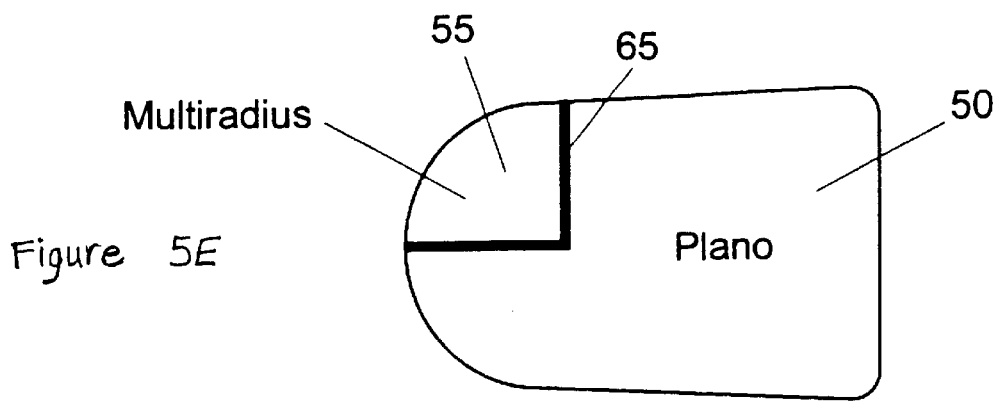
Figure 5F:
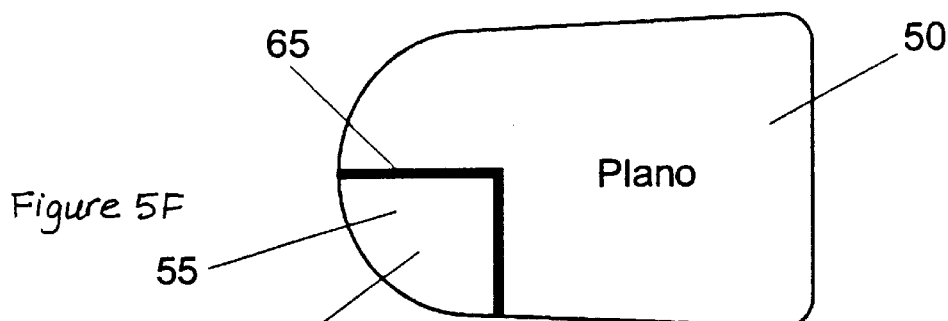
Figure 5G:
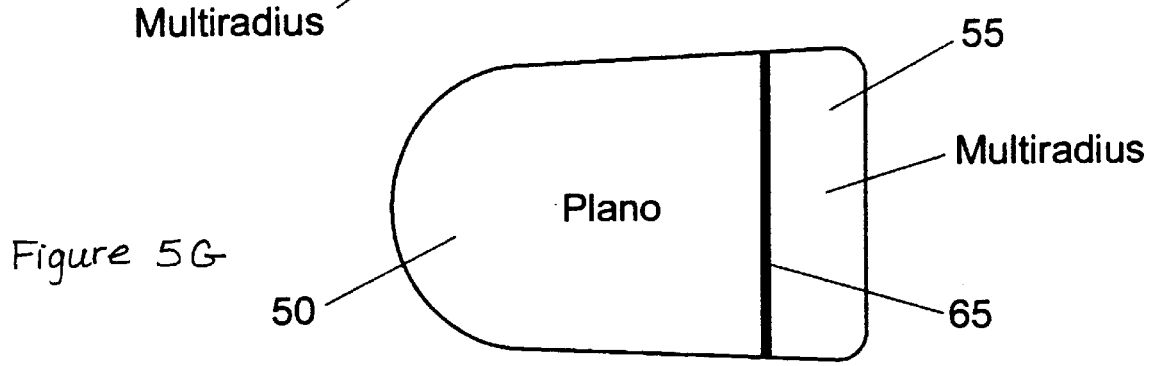
Figure 5H:
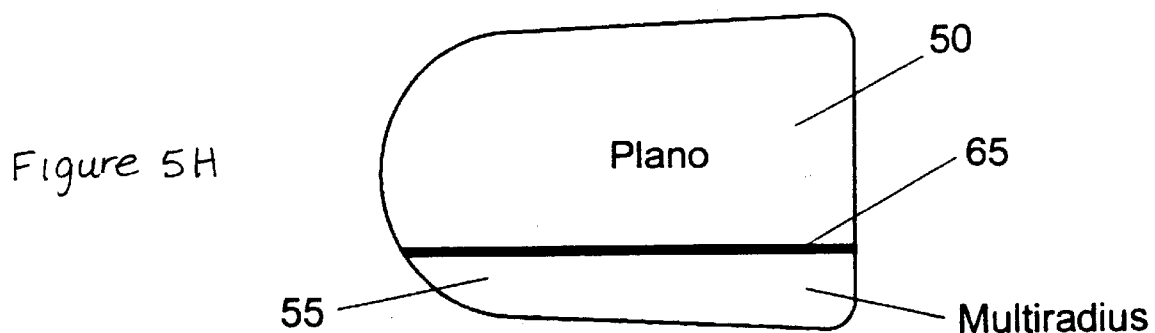

FIGS. 5A–5H shows various arrangements of multiradius reflective element 55 relative to its adjacent plano reflective element 50 (with demarcation element 65 disposed at their joint). In FIGS. 5A, 5B, 5C, 5E and 5F, plano element 50 is mounted wholly inboard of multiradius element 55. Thus, in FIGS. 5A, 5B, 5C, 5E and 5F, plano element 50 would be disposed closer to the vehicle body (and hence to the driver) than multiradius element 55 when plano-multiradius reflective element assembly 30 was mounted in an exterior sideview mirror attached to a side of an automobile. Therefore, in FIGS. 5A, 5B, 5C, 5E and 5F, plano element 50 would be mounted inboard relative to the side of the automobile and multiradius element 55 would be mounted outboard relative to the side of the automobile. In general, the location of the multiradius reflective element in the outboard, upper portion of the plano-multiradius reflective element assembly, as in FIGS. 5B and 5E, is preferred as this allows the plano portion provide a desired rearward field of view along the side of the vehicle. The configuration as shown in FIG. 5G (where the multiradius reflective element is along the inboard side of the assembly) is also desirable as this allows the driver view the side of the vehicle (something many drivers desire in order to have a frame of reference for their rearward field of view) while facilitating having a wide field of view for the plano portion.

Unlike trucks, busses and commercial vehicles the size of an exterior sideview mirror assembly suitable for use on an automobile (and especially when the automobile is not towing a trailer or the like) is restricted. Automobiles generally are non-commercial vehicles intended for personal transportation. Automobiles typically carry 5 passengers or less, although minivans and large sports utility vehicles (which are classified herein as automobiles) can have seat accommodation for up to 10 passengers (although accommodation for 7 passengers or less is more common). The tandem mounting of a plano element of unit magnification and a separate auxiliary element onto a common, single backing plate element, and the mounting of this backing plate element onto an actuator of an exterior sideview mirror assembly so that a driver can simultaneously and similarly move the auxiliary element and the plano element so as to position their respective rearward fields of view, and to achieve this within the relatively restricted space available in a standard automobile-sized exterior sideview mirror assembly is an important element of this present invention. By utilizing a plano element of unit magnification in the plano-multiradius reflective element assembly, and by sizing the reflector area of the plano element larger than the reflector area of the multiradius element and, preferably, by sizing the reflector area of the plano element at a sufficiently large size that the rearward field of view provided by the plano element alone meets and satisfies the minimum field of view requirement mandated by an automaker specification and/or a government regulation, the need to provide a safety warning indicia such as "OBJECTS IN MIRROR ARE CLOSER THAN THEY APPEAR" in the plano element and/or in the multiradius element can be obviated. Preferably, the plano element comprises a reflector surface area of a size sufficient, when mounted as part of a plano-multiradius reflective element assembly in a driver-side exterior sideview mirror assembly on an automobile, to provide the driver of the automobile a view of a level road surface extending to the horizon from a line, perpendicular to a longitudinal plane tangent to the driver's side of the automobile at the widest point, extending 8 feet out from the tangent plane 35 feet behind the driver's eyes (at a nominal location appropriate for any 95th percentile male driver or at the driver's eye reference points established in Federal Motor Vehicle Standard No. 104), with the driver seated in the driver's seat and with the driver's seat in the rearmost position. Also, preferably, the aspect ratio of the plano-multiradius reflective element assembly (defined as the ratio of its largest vertical dimension to its largest horizontal dimension, measured with the plano-multiradius reflective element assembly oriented as it would be oriented when mounted in an exterior sideview mirror assembly on an automobile, and with "horizontal" being generally parallel with the road surface the automobile travels on and "vertical" being generally perpendicular to the road surface the automobile travels on) is preferably less than 1, more preferably less than 0.8, most preferably less than 0.6. Further, it is preferable that the multiradius element be disposed outboard (relative to the side of the vehicle and with the plano-multiradius reflective element assembly oriented as it would be when mounted in an exterior sideview mirror assembly on an automobile) on the plano-multiradius reflective element assembly so that the multiradius element is positioned to provide an auxiliary, wide-angle view of a "blind-spot" region in an adjacent sidelane while the more inboard-disposed plano element with unit magnification provides the principal sideview image to the driver.

Also, it is preferable that the principal axis of the rearward field of view of the multiradius element be different from and angled to the principal axis of the rearward field of view of the plano element when both are attached to the backing plate element of the plano-multiradius reflective element assembly and when the plano-multiradius reflective element assembly is mounted and operated in an exterior sideview mirror assembly on an automobile. Preferably, the principal axis of the rearward field of view of the plano element is directed generally parallel to the road that the automobile equipped with the plano-multiradius reflective element assembly is travelling on (i.e. generally parallel to the longitudinal axis of the automobile) so as to provide the driver with a long-distance view of approaching vehicles in the side lane that the plano element views). However, preferably the principal axis of the rearward field of view of the multiradius element of, for example, a door-mounted driver-side (or passenger-side) exterior sideview mirror assembly in which the plano-multiradius reflective element assembly is mounted is directed generally downwardly towards the road surface adjacent to the driver seating location and/or several feet (such as about 1 foot to about 24 feet; more preferably, about 1 foot to about 12 feet; most preferably about 1 foot to about 8 feet in distance) to its rear (in order to capture a field of view of a rear approaching vehicle that is approaching to overtake, or is about to overtake, or is overtaking the automobile equipped with the plano-multiradius reflective element assembly). Thus, preferably, the principal axis of the rearward field of view of the multiradius element is angled and directed generally downwardly with respect to the longitudinal axis of the automobile and thus is at an angle to the principal axis of the rearward field of view of the plano element. For example, multiradius element 155 when attached to surface 173 of backing plate 160 (see FIG. 6B) would have its principal axis of rearward view as indicated by 180 as in FIG. 6B, and as such would be canted towards the road surface when mounted in an exterior sideview mirror assembly attached to the side of an automobile. By contrast, plano element 150 when attached to surface 174 of backing plate 160 (see FIG. 6A) would have a principal axis as indicated by 185 as in FIG. 6A and, as such, would be generally parallel to the road surface when mounted in an exterior sideview mirror assembly attached to the side of an automobile. Having the multiradius element canted somewhat downwards towards the road surface assists visual detection by the driver of overtaking vehicles in the traditional "blind-spot" in the adjacent side lane. The angle that the multiradius element is angled on the backing plate element of the plano-multiradius reflective element assembly relative to the plane of the plano reflective element will vary from automobile model to model, but generally is preferred to be in the about 1 degree to about 10 degree range; about 2 degree to about 8 degree range more preferred; and about 3 degree to about 6 degree range most preferred. In order to conveniently achieve an angling of the multiradius portion with respect to the plano portion (and preferably a downward angling), the portion of the backing plate element that the multiradius reflective element is attached to can be angled relative to the adjacent portion of the backing plate element that the plano reflective portion is attached to. Thus, and referring to FIG. 6, plano-multiradius reflective element assembly 130 includes a molded polymeric backing plate element 160 comprising a generally flat portion 162 (between BB and CC in FIG. 6) and an adjacent curved portion 161 (between AA and BB). As indicated by 190 and 195, portion AA to BB of backing plate element 160 is generally angled to portion BB to CC of backing plate 160. Preferably, the portion of backing plate element 160 to which the auxiliary reflective element attaches is angled towards the front (compared to the angling of plano reflective element) of an automobile equipped with the plano-auxiliary reflective element assembly of the present invention. FIG. 6 is a view of plano-multiradius reflective element assembly 130 as it would appear from above the vehicle as it would be orientated in use (with portion 162 closer to the driver than portion 161). The wall section, section XX in FIG. 6, taken through section 162 of backing plate element 160 is of substantially constant dimension (as illustrated in FIG. 6A) whereas the wall section, section YY in FIG. 6B, taken through section 161 of backing plate element 160 is of varying dimension and is angled. Plano reflective element 150 and multiradius reflective element 155 (for example, plano element 150 can comprise an electrochromic mirror element and multiradius element 155 can comprise a chrome coated glass reflector) are attached to portions 162 and 161, respectively. By being supported on the angled face 173 (see FIG. 6B) of portion 161, the principal viewing axis of multiradius reflector element 155 is angled downwards towards the road surface, as compared to the more horizontal-viewing principal viewing axis of plano element 150, when plano-multiradius reflective element 130 is mounted in an exterior sideview mirror assembly on an automobile. Demarcation element 165 is preferably molded in the same molding tool as is used to mold backing plate element 160, and so demarcation element 165 is formed as an integral part of backing plate element 160, forming a wall thereof that partitions the surface of backing plate element 160 into a region for receiving the plano reflective element 150 and a region for receiving the auxiliary reflective element 155. Also, end-caps 170 and 171 are optionally provided. Piano reflective element 150 can attach into the cavity formed between demarcation element 165 and end-cap 171; multiradius reflective element 155 can attach into the cavity formed between demarcation element 165 and end-cap 170. Note that the portion of the backing plate element where the wide-angle optic multiradius element attaches can have a thicker wall thickness than that of the portion of the backing plate element where the unit magnification optic element attaches in order to allow for the angling of the multiradius element downwardly relative to the angle of the plano element, as illustrated in FIGS. 6A–B. As illustrated in FIGS. 6A–B, the angle downwards to the longitudinal axis of the vehicle of the multiradius element can generally be set by an angling of a surface of the backing plate element in order to ensure that the principal axis of the rearward field of view of the plano element is directed generally parallel to the longitudinal axis of an automobile equipped with the plano-multiradius reflective element assembly and that the principal axis of the rearward field of view of the multiradius element is directed generally at an angle downwards to the longitudinal axis of the automobile.

Note that the provision of the plano-multiradius reflective element assembly of this invention as a unitary module has manufacturing advantages, particularly for exterior sideview mirror assembly manufacturers who can procure a plano-multiradius reflective element assembly module from a mirror reflector supplier and then mount the plano-multiradius reflective element assembly module onto an actuator.

Figure 7:
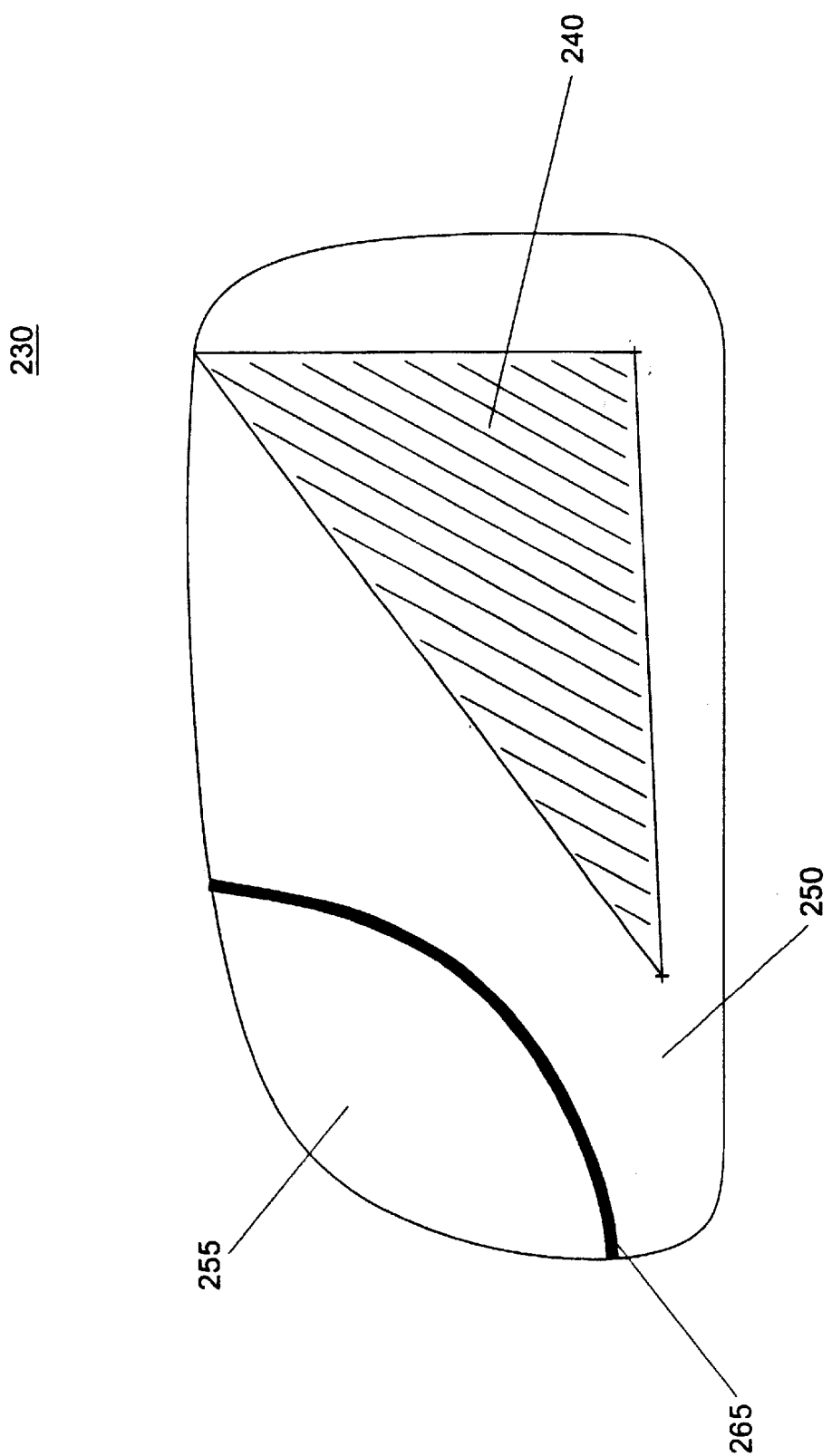
FIG. 7 is a schematic of a third embodiment of a plano-auxiliary reflective element assembly according to this present invention.

Referring to FIG. 7, a third embodiment 230 of a plano-multiradius reflective element assembly is illustrated. Plano-multiradius reflective element assembly 230 includes a plano reflective element 250 and a separate multiradius reflective element assembly 255, both individually attached to a backing plate element, and with demarcation element 265 disposed at their joint. Plano-multiradius reflective element assembly 230 is about 8.5 inches wide and about 4.25 inches tall (aspect ratio of 0.5), at their largest dimension. Shown as the shaded triangle 240 in plano reflective element 250 is the image of a triangular target object set about 35 feet rearward and of width about 8 feet and of height of about 4.1 feet as would be seen were plano-multiradius reflective element assembly 230 mounted in a driver-side exterior sideview mirror assembly in an automobile such as a sports utility vehicle. In general, it is desirable that the plano reflective element be dimensioned and configured so as to have its rearward field of view capture an image (that is visible, by reflection in the plano reflective element, to a driver seated in the driver's seat in an automobile to which is attached an exterior sideview mirror assembly equipped with the plano-auxiliary reflective element assembly according to this present invention) of a triangular shaped target located about 35 feet rearward of the driver seating location, extending about 8 feet out from the plane defined by the side of the automobile and reaching a height of between about 4 feet and about 5 feet from the road surface at that location 35 feet rearward of the automobile. The total field of view rearwardly of the vehicle of plano-multiradius reflective element assembly 230 (which is a combination of the field of view of plano reflective element 250 and of the auxiliary multiradius reflective element 255) preferably generally subtends an angle of at least about 30 degrees (and more preferably, generally subtends an angle of at least about 35 degrees and most preferably, generally subtends an angle of at least about 40 degrees) with respect to the side of an automobile to which is attached an exterior sideview mirror assembly equipped with plano-multiradius reflective element assembly 230.

Also, although it is preferable to utilize a multiradius or compound curvature reflective element such as an aspherical element or a compound curvature element for the auxiliary mirror element adjacent the plano reflective element (as this enables least discontinuity in image at the joint between the adjacent elements of the assembly), a spherical reflective element (that has substantially only one radius of curvature and, as such, is a section from a sphere) can optionally be used adjacent the plano reflective element instead of, or in addition to, the multiradius reflective element. Also, a plano auxiliary mirror such as a flat mirrored substrate can be used, less preferably, as a substitute for a multiradius reflective element in those embodiments where the auxiliary reflective element is angled relative to the plane of the principal, plano reflective element so as to view a blind spot region of the principal plano element. Also, the plano-multiradius reflective element assembly can optionally be fixedly attached to an exterior sideview mirror assembly housing that is not movable, or, alternately, the exterior sideview mirror assembly housing to which the plano-multiradius reflective element assembly is fixedly attached can itself be actuated to move, such as by motor action, so that by moving the exterior sideview mirror assembly housing, the field of rearward view of the plano-multiradius reflective element assembly fixedly attached thereto can correspondingly move and be repositioned to suit the field of view need of a particular driver seated in the automobile cabin.

The above description is considered that of the preferred embodiments only. Modification of the invention will occur to those skilled in the art and to those who make or use the invention. Therefore, it is understood that the embodiments shown in the drawings and described above are merely for illustrative purposes and are not intended to limit the scope of the invention, which is defined in the following claims as interpreted according to the principles of patent law, including the doctrine of equivalents.

I claim:

1. An exterior sideview mirror system suitable for use on an automobile, said exterior sideview mirror system comprising:

an exterior sideview mirror assembly adapted for attachment to a side of an automobile;

said exterior sideview mirror assembly including a reflective element having a rearward field of view when attached to the side of the automobile;

said reflective element attached to an electrically-operated actuator and movable by said actuator in order to position said rearward field of view in response to a control;

wherein said reflective element comprises a plano-multiradius reflective element assembly, said plano-multiradius reflective element assembly comprising a plano reflective element having unit magnification and a separate multiradius reflective element having a multiradius curvature, said plano reflective element having a rearward field of view with a principal axis;

said plano reflective element and said multiradius reflective element of said plano-multiradius reflective element assembly mounted adjacently in said plano-multiradius reflective element assembly in a side-by-side relationship and not superimposed with one reflective element on top of the other reflective element, and supported by a backing plate element, said backing plate element mounting to said actuator such that movement of said backing plate element of said plano-multiradius reflective element assembly by said actuator simultaneously and similarly moves said plano reflective element and said multiradius reflective element, said multiradius reflective element having a rearward field of view with a principal axis, said backing plate element have a first support portion supporting said plano-reflective element and a second support portion supporting said multiradius reflective element, said second support portion tilted forward with respect to said first support portion whereby said principal axis of said rearward field of view of said multiradius reflective element is angled downwardly and outwardly with respect to said principal axis of said rearward field of view of said plano reflective element when said multiradius reflective element and said plano reflective element are supported by said backing plate element of said plano-multiradius reflective element assembly and when said plano-multiradius reflective element assembly is mounted in said exterior sideview mirror assembly on the automobile, and said principal axis of said rearward field of view of said plano reflective element being directed generally parallel to the longitudinal axis of the automobile equipped with the plano-multiradius reflective element assembly and wherein said principal axis of said rearward field of view of said multiradius reflective element is directed generally at an angle downwards to the longitudinal axis of the automobile; and said multiradius reflective element being positioned diagonally at an outboard upper portion of said plano-multiradius reflective element assembly when said exterior sideview mirror assembly is mounted to the side of the automobile.

2. The exterior sideview mirror system of claim 1, wherein said plano reflective element and said multiradius reflective element are adjacently attached to said backing plate element at a joint, and wherein said plano-multiradius reflective element assembly includes a demarcation element, said demarcation element disposed at said joint to form a demarcation between said plano reflective element and said multiradius reflective element, said demarcation element having a portion visible to a driver of the automobile.

3. The exterior sideview mirror system of claim 2, wherein said demarcation element is dark colored.

4. The exterior sideview mirror system of claim 3, wherein said demarcation element is dark colored with a color selected from the group consisting of black, grey, blue and brown.

5. The exterior sideview mirror system of claim 3, wherein said demarcation element comprises at least one of a polymer material, a tape, a plastic film, a paint, a lacquer and a caulk.

6. The exterior sideview mirror system of claim 5, wherein said demarcation element comprises a polymer material.

7. The exterior sideview mirror system of claim 2, wherein said joint comprises a space between said plano reflective element and said multiradius reflective element.

8. The exterior sideview mirror system of claim 7, wherein said demarcation element is at least partially disposed in said space between said plano reflective element and said multiradius reflective element.

9. The exterior sideview mirror system of claim 2, wherein said demarcation element comprises a wall on said backing plate element, said wall located on said backing plate element at said joint, said wall separating said plano reflective element from said multiradius reflective element.

10. The exterior sideview mirror system of claim 2, wherein said portion visible to a driver of the automobile has a width less than about 4 mm.

11. The exterior sideview mirror system of claim 2, wherein said portion visible to a driver of the automobile has a width less than about 3 mm.

12. The exterior sideview mirror system of claim 2, wherein said portion visible to a driver of the automobile has a width less than about 2 mm.

13. The exterior sideview mirror system of claim 2, wherein said portion visible to a driver of the automobile has a width greater than about 0.5 mm.

14. The exterior sideview mirror system of claim 2, wherein said portion visible to a driver of the automobile has a width greater than about 0.75 mm.

15. The exterior sideview mirror system of claim 2, wherein said portion visible to a driver of the automobile has a width greater than about 1 mm.

16. The exterior sideview mirror system of claim 1, wherein said plano reflective element is supported by said backing plate element by at least one of an adhesive attachment and a mechanical attachment.

17. The exterior sideview mirror system of claim 1, wherein said multiradius reflective element is supported by said backing plate element by at least one of an adhesive attachment and a mechanical attachment.

18. The exterior sideview mirror system of claim 1, wherein said multiradius reflective element is supported by said backing plate element at a location such that, when said exterior mirror assembly is attached to a side of an automobile, at least a portion of said plano reflective element is disposed closer to said side of the automobile than any portion of said multiradius reflective element.

19. The exterior sideview mirror system of claim 1, wherein said multiradius reflective element comprises a bent glass substrate with radii of curvature in the range of from about 4.000 mm to about 50 mm.

20. The exterior sideview mirror system of claim 1, wherein the ratio of the width of said plano reflective element to the width of said multiradius reflective element is greater than 1.

21. The exterior sideview mirror system of claim 1, wherein the ratio of the width of said plano reflective element to the width of said multiradius reflective element is greater than 1.5.

22. The exterior sideview mirror system of claim 1, wherein the ratio of the width of said plano reflective element to the width of said multiradius reflective element is greater than 2.5.

23. The exterior sideview mirror system of claim 1, wherein said angle downwards to the longitudinal axis of the automobile is in the range from about 1 degree to about 10 degrees.

24. The exterior sideview mirror system of claim 1, wherein said angle downwards to the longitudinal axis of the automobile is in the range from about 2 degrees to about 8 degrees.

25. The exterior sideview mirror system of claim 1, wherein said angle downwards to the longitudinal axis of the automobile is in the range from about 3 degrees to about 6 degrees.

26. The exterior sideview mirror system of claim 1, wherein said angle downwards to the longitudinal axis of the automobile is generally set by an angling of a surface of said backing plate element.

27. The exterior sideview mirror system of claim 1, wherein said exterior sideview mirror assembly comprises a door-mounted exterior sideview mirror assembly adapted for attachment to a side of the automobile adjacent a driver seating location of a driver of the automobile and wherein the principal axis of the rearward field of view of said multiradius reflective element is directed generally downwardly towards the road surface adjacent to the driver seating location at a distance in the range of about 1 foot to about 24 feet to the rear of the driver seating location.

28. The exterior sideview mirror system of claim 1, wherein said exterior sideview mirror assembly comprises a door-mounted exterior sideview mirror assembly adapted for attachment to a side of the automobile adjacent a driver seating location of a driver of the automobile and wherein the principal axis of the rearward field of view of said multiradius reflective element is directed generally downwardly towards the road surface adjacent to the driver seating location at a distance in the range of about 1 foot to about 12 feet to the rear of the driver seating location.

29. The exterior sideview mirror system of claim 1, wherein said exterior sideview mirror assembly comprises a door-mounted exterior sideview mirror assembly adapted for attachment to a side of the automobile adjacent a driver seating location of a driver of the automobile and wherein the principal axis of the rearward field of view of said multiradius reflective element is directed generally downwardly towards the road surface adjacent to the driver seating location at a distance in the range of about 1 foot to about 8 feet to the rear of the driver seating location.

30. The exterior sideview mirror system of claim 1, wherein said exterior sideview mirror assembly comprises a fixedly attached exterior sideview mirror assembly.

31. The exterior sideview mirror system of claim 1, wherein said exterior sideview mirror assembly comprises a break-away exterior sideview mirror assembly.

32. The exterior sideview mirror system of claim 1, wherein said exterior sideview mirror assembly comprises a powerfold exterior sideview mirror assembly.

33. The exterior sideview mirror system of claim 1, wherein said control comprises a memory controller.

34. The exterior sideview mirror system of claim 1, wherein at least one of said plano reflective element and said multiradius reflective element comprises an electro-optic reflective element.

35. The exterior sideview mirror system of claim 1, wherein both said plano reflective element and said multiradius reflective element comprise an electro-optic reflective element.

36. The exterior sideview mirror system of claim 1, wherein said plano reflective element comprises an electro-optical reflective element.

37. The exterior sideview mirror system of claim 36, wherein said electro-optical reflective element comprises an electrochromic reflective element.

38. The exterior sideview mirror system of claim 37, wherein said multiradius reflective element comprises a fixed reflectance mirror reflector.

39. The exterior sideview mirror system of claim 38, wherein said fixed reflectance mirror reflector comprises a bent glass substrate coated with a metallic reflector coating.

40. The exterior sideview mirror system of claim 1, wherein said plano-multiradius reflective element assembly is formed in an integral molding operation.

* * * * *

UNITED STATES PATENT AND TRADEMARK OFFICE
CERTIFICATE OF CORRECTION

| | |
|---|---|
| PATENT NO. | : 6,522,451 B1 |
| APPLICATION NO. | : 09/478315 |
| DATED | : February 18, 2003 |
| INVENTOR(S) | : Niall R. Lynam |

It is certified that error appears in the above-identified patent and that said Letters Patent is hereby corrected as shown below:

Column 11:
Line 54, "Piano" should be --Plano--.

Column 15:
Line 53, "Piano" should be --Plano--.

Column 19:
Line 22, Claim 19, "4.000" should be --4000--

Signed and Sealed this

Eleventh Day of March, 2008

JON W. DUDAS
*Director of the United States Patent and Trademark Office*